United States Patent [19]

Imai et al.

[11] 4,223,197
[45] Sep. 16, 1980

[54] METHOD OF COOLING WELD IN STEEL PIPING AND APPARATUS THEREFOR

[75] Inventors: Katsuyuki Imai; Isao Masaoka; Yositeru Chiba; Jiro Kuniya, all of Hitachi, Japan

[73] Assignee: Hitachi, Ltd., Japan

[21] Appl. No.: 897,403

[22] Filed: Apr. 18, 1978

[51] Int. Cl.² ............................................. B23K 31/06
[52] U.S. Cl. ................................. 219/61.7; 228/46; 228/222
[58] Field of Search ................... 148/136; 239/251; 219/61.7; 228/46, 200, 222

[56] References Cited

U.S. PATENT DOCUMENTS

| | | | |
|---|---|---|---|
| 1,594,321 | 7/1926 | Norman | 239/251 |
| 2,259,367 | 10/1941 | Ely et al. | 228/46 |
| 3,125,297 | 3/1964 | Copeland et al. | 239/251 |
| 4,152,568 | 5/1979 | Yamaguchi et al. | 228/222 X |

FOREIGN PATENT DOCUMENTS

5222539  2/1977  Japan .................................. 219/61.7

OTHER PUBLICATIONS

*Welding Handbook*, Section 3A, Sixth Edition, American Welding Society, N.Y., 1970, TS227, A5hC.3, pp. 44–64.

*Primary Examiner*—B. A. Reynolds
*Assistant Examiner*—Keith E. George
*Attorney, Agent, or Firm*—Craig & Antonelli

[57] ABSTRACT

A method for cooling a weld in steel piping during butt welding with cooling of the inside comprises, after joining of pipe ends by a root pass on the inside, cooling the junction being welded by subsequent passes with injection of a liquid medium at room temperature from the center of the pipe against the surrounding wall, in a direction between radial and tangential directions relative to the inner pipe surface. An apparatus for practicing the cooling method comprises a rotatable multi-nozzle assembly having a radius of rotation corresponding to the inside diameter of the pipe and is capable of injecting the cooling medium against the inner surface of the pipe, a duct for conducting the cooling medium to the nozzles, and a pumping device for forcing the cooling medium under pressure into the nozzles.

6 Claims, 17 Drawing Figures

METHOD OF COOLING WELD IN STEEL PIPING AND APPARATUS THEREFOR

This invention relates to an apparatus for water cooling the inside of pipings for chemical plants and for nuclear equipment, during the course of welding. More particularly, the invention relates to a method and an apparatus suitable for lessening the residual stresses and carbide precipitation in the inner welded surfaces of austenitic stainless steel pipings to be exposed to corrosive environments.

Usually austenitic stainless steels precipitate chromium carbide upon heating to 500°–800° C. This is because the carbon in solid solution with the austenite structure transforms into chromium carbide, which grows in the form of netting along the crystal grain boundary. In the resulting chromium deposition layer the corrosion resistance of the metal decreases, leading to intercrystalline corrosion in corrosive environments.

This intercrystalline carbide precipitation upon heating to an elevated temperature for a relatively short period of time, as for welding, is accelerated by factors such as welding stresses. For instance, the precipitate is observed in the steel kept at a temperature between 500° and 800° C. for about 20 seconds. Especially, the welds tend to develop intercrystalline stress corrosion cracking in certain environments due to residual stresses and stresses resulting from operation, in addition to the carbide precipitation. In welding actual structures, therefore, it is customary to limit the welding heat input, lower the interpass temperature, or take other measures so as to minimize the carbide precipitation.

Stress-relief annealing, which is apparently appropriate for improving the metallurgical metal structure of the heat affected zone and relieving the residual stresses in the zone, seems to be seldom in use, because it involves a heat treatment in a high temperature range of 850°–930° C. and tends to invite deformation as a result of the heat treatment.

Also, while the peening process may appear applicable for the reduction of the residual stresses upon welding, various difficulties must be overcome before the process is actually applied to the welds on the inner surfaces of pipes.

The present invention has for its object to provide a method for cooling the inner surface of steel piping of welded construction, whereby stress corrosion cracking of the welded inner surface can be lessened through effective control of the residual stresses in the weld and carbide precipitation, and also to provide a water cooling apparatus for practicing the method.

This invention has been perfected on the basis of the recognition that the chromium oxide precipitation and residual stresses in the weld on the inner surface of the pipe are major causes for the stress corrosion cracking of the weld in austenitic stainless steel piping. The water jet cooling apparatus for the inner pipe surface which can lessen both of the factors is characterized by three or more cooling nozzles which are joined at the rear ends and adapted to rotate together, with their free ends spaced from 5 to 20 mm away from the surrounding wall surface of the pipe so that a remarkable cooling effect can be achieved.

An embodiment of the invention will now be described with reference to the accompanying drawings.

Figure 3A:
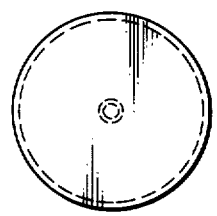
Figure 3B:
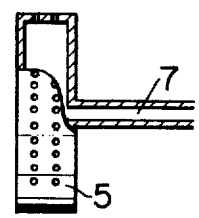
Figure 4A:
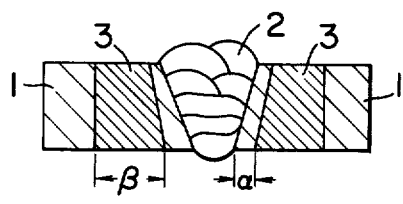
Figure 4B:
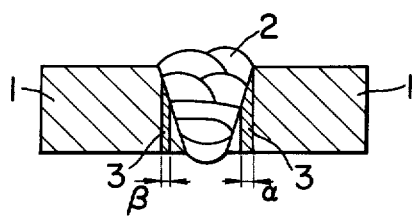
Figure 6:
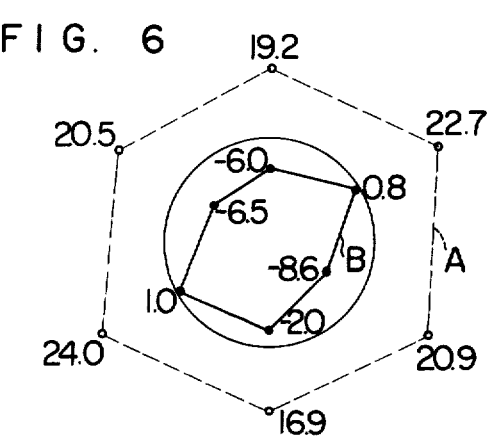
Figure 7:
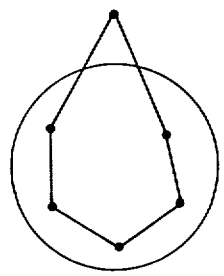
Figure 5A:
Figure 5B:
Figure 8A:
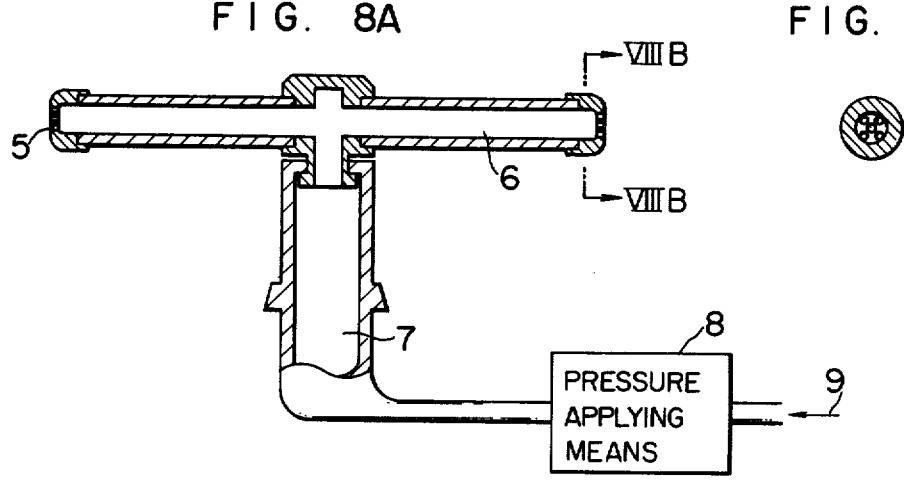
Figure 8B:
Figure 8C:
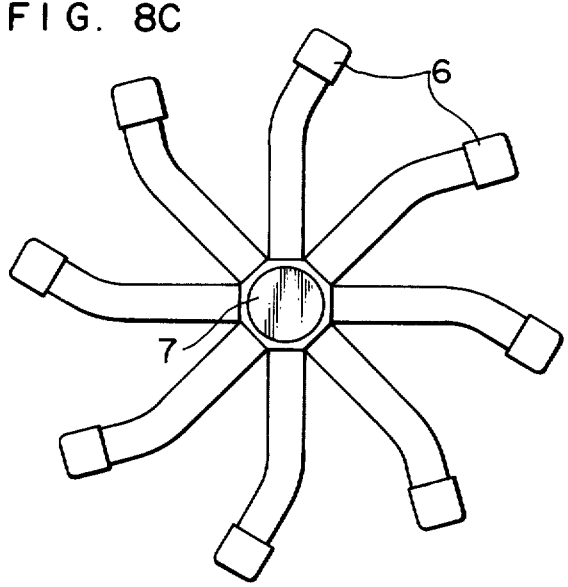
Figure 9:
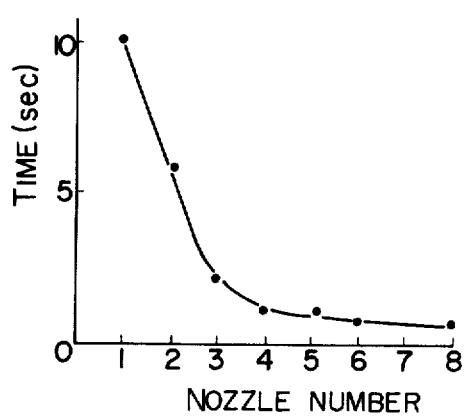
Figure 10:
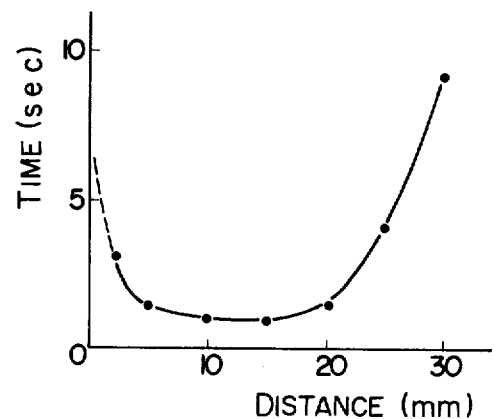

FIGS. 3A and 3B schematically show a water cooling apparatus;

FIGS. 4A and 4B show the carbide precipitate zones in welds formed respectively by conventional and water cooled methods;

FIGS. 5A and 5B show photographs of welds in cross section indicating modes of carbide precipitation;

FIG. 6 is a graph comparing the residual stresses in a weld formed by a prior art method with those according to the present invention;

FIG. 7 is a graphic representation of residual stress distribution according to the water cooled method;

FIGS. 8A, 8B and 8C show schematically a rotary water jet cooling apparatus embodying the invention; and FIGS. 9 and 10 are graphs showing the relations between the retention time at 800°–500° C. in the heat cycle during two-pass welding of an inner pipe surface and the number of nozzles used or the distance from the nozzle tips.

Figure 11:
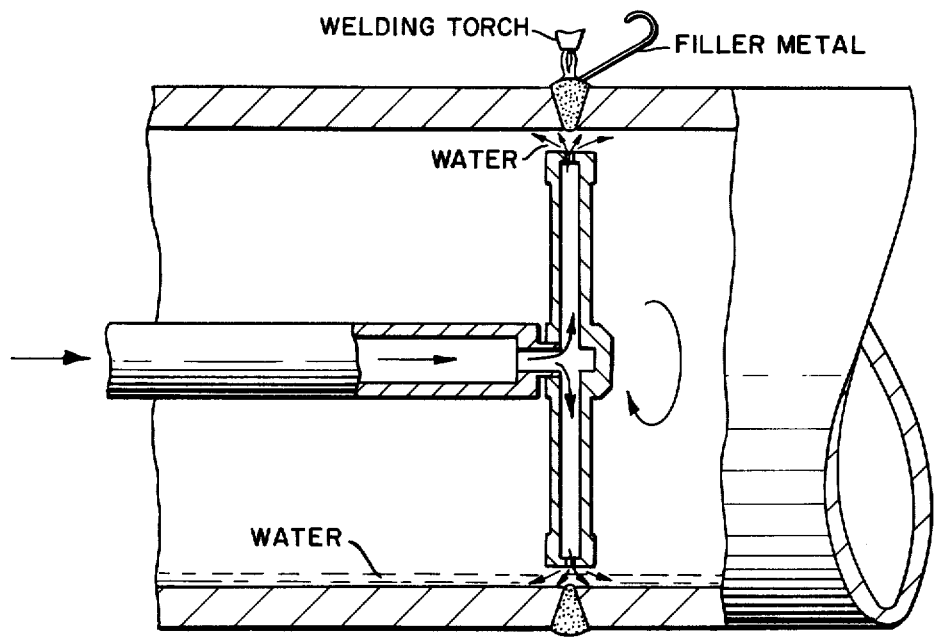
Figure 12:
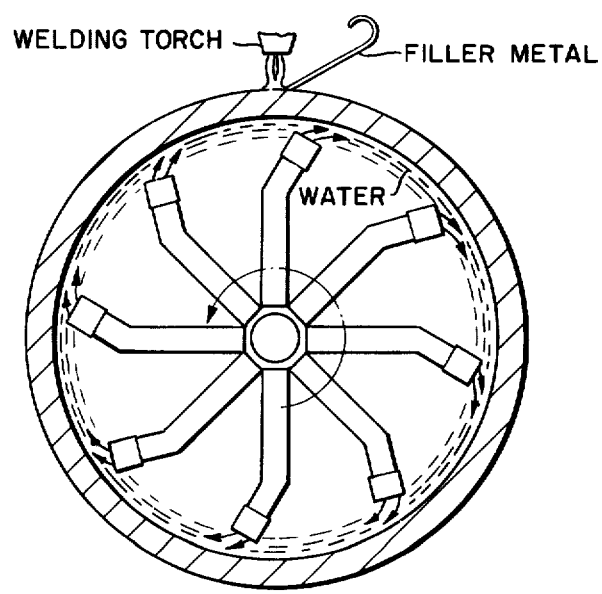

FIGS. 11 and 12 show rotary jet cooling apparatus embodying the invention positioned inside a pipe.

Figure 1:
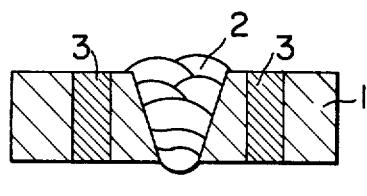
FIG. 1 is a typical sectional view of a weld, showing precipitate zones.
Figure 2:
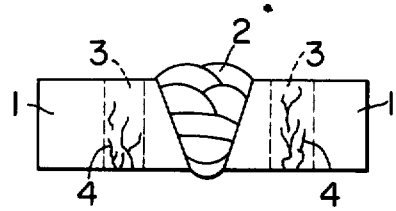
FIG. 2 is a view similar to FIG. 1 but indicating stress corrosion cracks.

Referring now to FIG. 1, which shows a typical section through a weld in an austenitic stainless steel, the reference numeral 1 indicates the base metal, 2 the deposited metal, and 3 the zones where chromium carbide precipitated. FIG. 2 is a similar sectional view of a weld cracked as is often the case with actual structures of welded construction, the numeral 4 designating the cracks 4. The cracks appear first in the carbide precipitate zones exposed to corrosive environments and develop outwardly along the crystal grain boundaries. Also, the cracks often grow in parallel with the weld line.

Thus, with the view to restricting the chromium carbide precipitate zones and residual stresses in the weld, experiments were made in accordance with the present invention to weld a pipe of the above-mentioned steel while water cooling the inside of the pipe being welded by the water cooler means shown in FIG. 3. It was found possible, as a result, to narrow down the precipitate zones in the weld on the inner pipe surface and reduce the residual stresses due to welding.

By way of example, an austenitic stainless steel pipe 114.3 mm in outside diameter and 8.6 mm in wall thickness was butt welded in the following way. The pipe for the experiment was held horizontally, and the pipe ends to be joined were welded alternately from the both sides in all positions from the bottom upward. Up to the third passes were given by gas tungsten arc welding, and from the fourth pass water cooled method was started with the fourth pass. For the experiment the water temperature was in the range of 20°–30° C. and the water flow rate was 16 l/min. In the conventional method, by contrast, welding was done with an interpass temperature of 180° C.

FIG. 4 shows the results of nitric-fluoric acid corrosion tests conducted on the precipitate zones of welds, in a conventional way (A) and by the water cooled method (B). The following table gives a summary of the distances $\alpha$ from the boundary between the weld and the inner pipe surface to the precipitate zones and the widths $\beta$ of the precipitate zones. As can be seen from these results, the water cooled method can remarkably narrow down the precipitate zones as compared with the conventional method.

|   | α (mm) | β (mm) |
|---|--------|--------|
| A | 3.3    | 8.8    |
| B | 1.5    | 1.5    |

FIG. 5 gives photographs of weld section showing how carbide precipitation occurs in the macrostructures of welds formed by the conventional method (A) and by the water cooled method (B). The dark colored portions in the heat affected zones represent the carbide precipitate zones.

FIG. 6 illustrates an exemplary distribution of residual stresses circumferentially of the heat affected zone on the inside of a pipe. The residual stresses were measured at six points of the circumference by the two arms method with a gauge length setting of 2 mm. The broken-line polygon (A) represents the conventional method and the full-line polygon (B), the water cooled method. It will be appreciated from the figure that the stresses produced in the water cooled method are considerably less than those in the conventional method.

Nevertheless, the residual stresses in the inner surface layer of the pipe are not always compressive because the water cooled method is resorted to; they can be tensile depending on the type of water cooling jig or the cooling procedure used. FIG. 7 shows the results of inadequate cooling of the inside of welded joint. As shown, the residual stresses are compressive throughout except at the top of the pipe where they are tensile. The weld portion where the residual stresses were tensile was subjected to a nitric-fluoric acid corrosion test, when a carbide precipitate zone as photographed in FIG. 5(A) resulted. This is ascribed to the fact that an adequate cooling effect was not obtained because of bubbling or other unfavorable phenomenon that took place during the welding.

The present invention is directed to positive cooling of the inner surface of the welded pipe by use of a rotary water jet cooling apparatus as means of overcoming the afore-described difficulties of the prior art method.

It is to be noted that mere employment of a rotary water jet cooler will not necessarily lead to an adequate cooling effect. The water supply being the same, the cooling effect will vary with the conditions, such as the diameter of the pipe, number of nozzles, distance between the inner pipe surface and nozzles, and the diameter of nozzle orifices.

The results of a few experiments made in this connection will now be discussed. FIG. 8 shows schematically a water jet cooling apparatus of eight-nozzle type used for the experiments. The nozzles were made of a chrome-plated brass pipe 0.2 mm in wall thickness and 8 mm in outside diameter. The opening end of each nozzle was drilled to form five 1 mm-dia. holes. Throughout the experiments the shape of the nozzle assembly was unchanged and the water supply (15 l/min) was kept constant. (A) is a transverse sectional view of the nozzle assembly, (B) is a cross sectional view taken on the line VIIIB—VIIIB, and (C) is a front view of the assembly.

In another series of welding experiments, an austenitic stainless steel pipe 216.3 mm in outside diameter and 12.7 mm in wall thickness was welded to the second pass by gas tungsten arc welding with a welding heat input of 11000 J/cm. FIG. 9 graphically indicates the relationship between the period of time required for cooling from 800° down to 500° C. in the 12 o'clock position of the inner surface of the welded pipe and the number of nozzles used (the distance between the inner surface and the nozzle tip being constant at 15 mm). The smaller the number of the nozzle employed, the longer the cooling time required. Arrangements using three or more nozzles exhibited marked cooling effects. FIG. 10 represents the relationship between the cooling time and the distance from the tips of water cooling nozzles (in a five-nozzle assembly) and the surrounding wall of the pipe welded under the same conditions as in FIG. 9. A distance of less than 20 mm is satisfactory for achieving an adequate cooling effect, whereas distances exceeding 20 mm produce less cooling effect. A desirable distance is not less than 5 mm, because too short a distance can bring the nozzle tips of the rotating assembly into contact with the weld beads.

FIG. 11 shows a rotating nozzle assembly positioned inside a pipe at a weld. As can be seen, liquid medium, e.g. water, is injected from the nozzle against the inside surface of the pipe, to cool the pipe during welding. FIG. 12 shows a rotating nozzle assembly positioned inside a pipe, and, in particular, shows the water being injected against the inner surface of the pipe in a direction between the radial direction and tangential direction relative to the inner surface of the pipe.

Since the proper conditions for welding by use of the rotary water jet cooling apparatus became clear from the foregoing experiments, subsequent experiments were conducted on the residual stresses in welds of an austenitic stainless steel pipe 216.3 mm in outside diameter and 12.7 mm in wall thickness. The pipe was kept on the level for welding. The welding heat input was in the range of 11000-15000 J/cm, the interpass temperature was 100°-180° C. in the conventional (naturally cooled) method and 20°-30° C. in the (five-nozzle cooled) method of the invention. In either case the total number of passes was twelve. Water cooling was effected on the second and ensueing passes of welding. The results were that the compressive residual stresses in a 3 mm heat affected zone in the axial direction of the inner pipe surface according to the method of the invention ranged from $-23.9$ to $-18.5$ kg/mm$^2$ as compared with the axial residual stresses of $-1.5$ to $19.8$ kg/mm$^2$ obtained by the conventional method.

In order to determine the residual stresses in the weld of an austenitic stainless steel pipe welded in conformity with the method of the invention, the test piece was examined by the dye penetrant inspection for any crack following a corrosion test of the piece by immersion in a boiling 42% MgCl$_2$ solution for 120 hours. No crack was observed in the test piece according to the invention in contrast to serious cracking of a conventional weld. This is because the residual stresses in the former were compressive.

According to the present invention, which is strikingly effective for reduction of the chromium carbide precipitate zones and of the residual stresses in butt welded structures of austenitic stainless steel pipes, welded joints with reduced stress corrosion cracking in the welds can be provided.

What is claimed is:

1. A method for cooling a weld in a steel pipe during butt welding with cooling of the inside, which comprises, after joining of pipe ends by a root pass on the inside, cooling the junction being welded by subsequent passes by injecting a liquid medium which is liquid at 20°-30° C. against the inner pipe surface at the weld junction, in a direction between radial and tangential directions relative to said inner surface, said liquid medium being injected by positioning a nozzle assembly rotatably disposed coaxially within said pipe, which nozzle assembly has an outer diameter smaller than the inside diameter of said steel pipe, rotating said nozzle assembly, and injecting said liquid medium from said rotating nozzle assembly against the inner pipe surface at the weld junction, said nozzle assembly including three or more nozzles whose tips are spaced a distance of 5 to 20 mm from the inner surface of the steel pipe.

2. A method according to claim 1, wherein said steel pipe is an austenitic stainless steel pipe.

3. A method according to claim 1, wherein the liquid medium is at room temperature when injected against the inner pipe surface at the weld junction.

4. A method according to claim 1, wherein the liquid medium is water.

5. An apparatus for cooling a weld in a steel pipe during butt welding with cooling of the inside, which comprises a nozzle assembly rotatably disposed coaxially within a pipe at a weld zone, which nozzle assembly has an outer diameter smaller than the inside diameter of said pipe and which is capable of injecting a medium, which is liquid at room temperature, against the inner pipe surface at said weld zone, said nozzle assembly being adapted to inject said medium against the inner surface of said pipe in a direction between radial and tangential directions relative to said inner surface, said nozzle assembly including three or more nozzles whose tips are spaced a distance of 5 to 20 mm from said inner surface of said pipe, a ducting for conducting said liquid to said nozzle assembly, and a pumping device for forcing said liquid under pressure into said nozzle assembly.

6. An apparatus according to claim 5, wherein said steel pipe is an austenitic stainless steel pipe.

* * * * *